United States Patent [19]

Tanaka

[11] 4,122,463
[45] Oct. 24, 1978

[54] AUTOMATIC DIAPHRAGM ADJUSTING DEVICE FOR CAMERA HAVING FLASHMATIC MECHANISM

[75] Inventor: Harumi Tanaka, Kobe, Japan

[73] Assignee: Minolta Camera Kabushiki Kaisha, Osaka, Japan

[21] Appl. No.: 821,346

[22] Filed: Aug. 3, 1977

[30] Foreign Application Priority Data

Aug. 13, 1976 [JP] Japan .................................. 51-97294

[51] Int. Cl.² .......................... G03B 7/00; G03B 15/03; G03B 13/14; G03B 17/00

[52] U.S. Cl. ........................................ 354/21; 354/41; 354/149; 354/221; 354/289

[58] Field of Search ..................... 354/21, 27, 28, 32, 354/126, 129, 139, 149, 275, 219, 221, 35, 41, 40, 26

[56] References Cited

U.S. PATENT DOCUMENTS

| | | | |
|---|---|---|---|
| 3,118,356 | 1/1964 | Sauer et al. ........................ | 354/40 X |
| 3,125,939 | 3/1964 | Bundschuh et al. .................... | 354/21 |
| 3,131,619 | 5/1964 | Rentschler ........................... | 354/41 |
| 3,491,670 | 1/1970 | Rentschler ........................... | 354/21 |
| 3,498,192 | 3/1970 | Tadashi et al. ...................... | 354/35 |
| 3,505,936 | 4/1970 | Engelsmann et al. .................. | 354/21 |
| 3,587,431 | 6/1971 | Holler ................................. | 354/40 X |
| 3,843,248 | 10/1974 | Iyama et al. ....................... | 354/149 X |

FOREIGN PATENT DOCUMENTS

1,213,541 11/1970 United Kingdom ...................... 354/40

*Primary Examiner*—Donald A. Griffin
*Attorney, Agent, or Firm*—Watson, Cole, Grindle & Watson

[57] ABSTRACT

A camera includes: a spring urging a diaphragm adjusting member, which is capable of being set to a desired aperture position, to either one of maximum and minimum aperture setting positions; an automatic flashmatic mode setting member operable upon the mounting of a flash means on a camera; and the flashmatic member interlocking a focus adjusting member with the diaphragm adjusting member in such a manner that a diaphragm aperture may be set commensurate with an object-to-lens distance set by the focus adjusting member. The mounting of the flash means causes the diaphragm adjusting member to return to such one aperture setting position under the action of a spring so as to establish the flashmatic mode, wherein a diaphragm aperture may be automatically adjusted commensurate with an object-to-lens distance.

8 Claims, 3 Drawing Figures

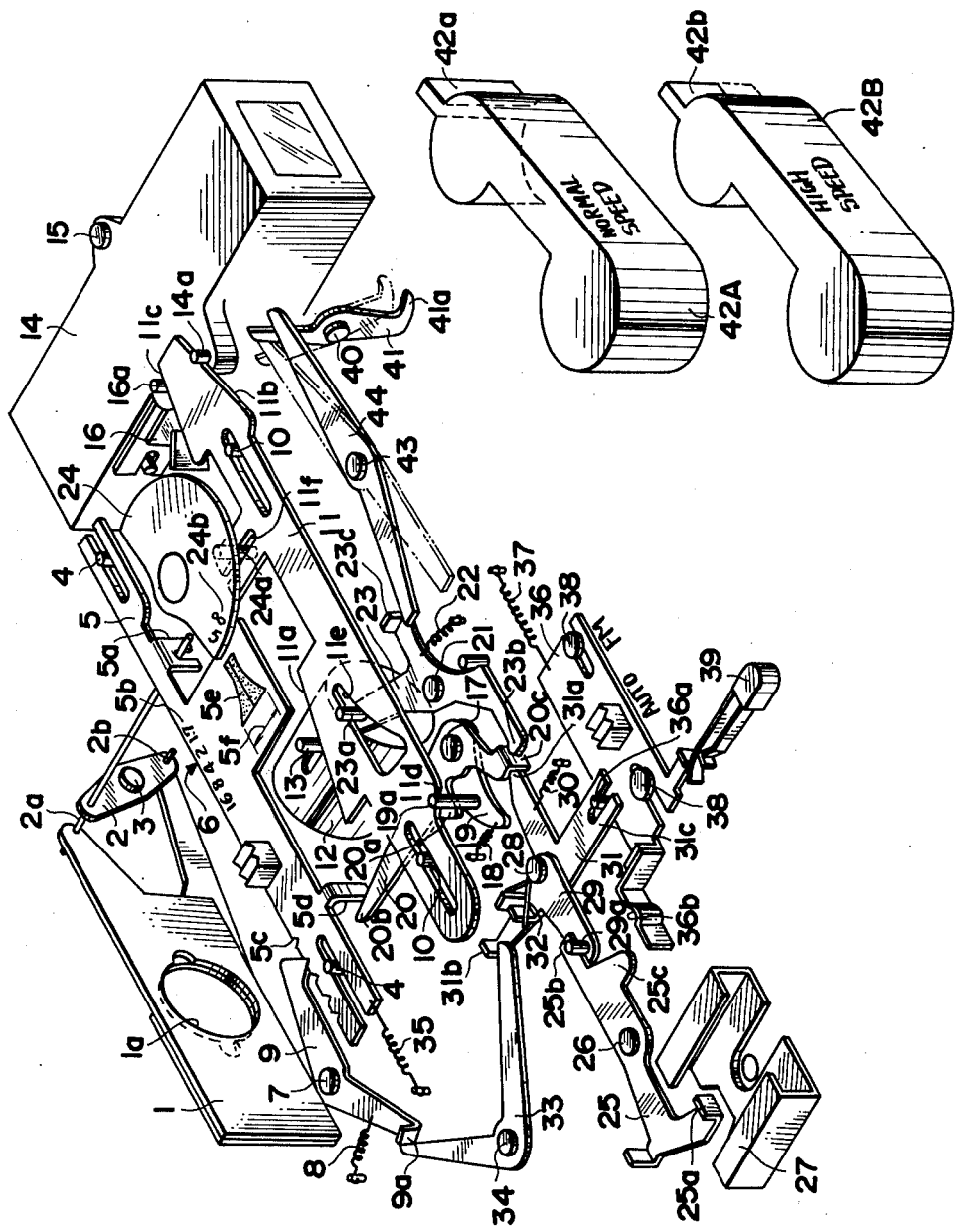

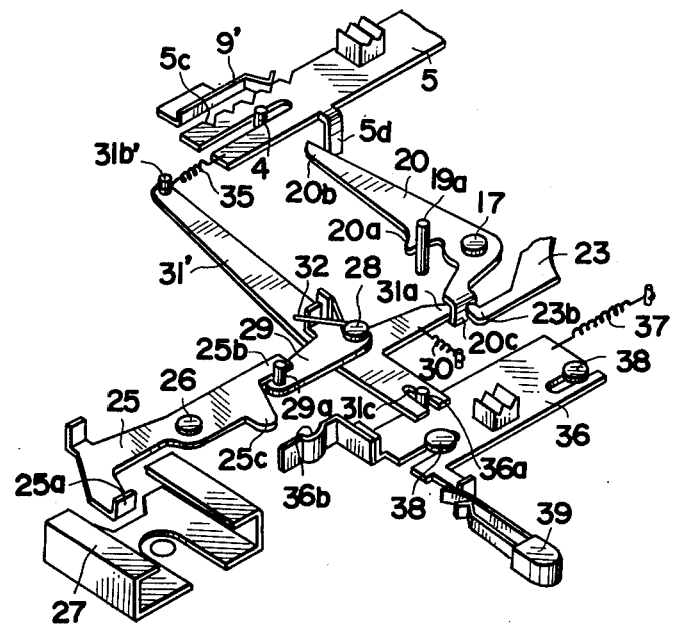
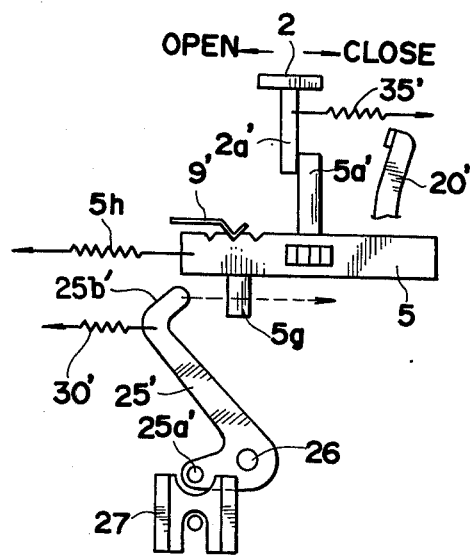

AUTOMATIC DIAPHRAGM ADJUSTING DEVICE FOR CAMERA HAVING FLASHMATIC MECHANISM

BACKGROUND OF THE INVENTION

The present invention relates to a camera, wherein the diaphragm aperture thereof may be set manually, and more particularly pertains to a camera having an automatic flashmatic mode setting device so that, when the camera is switched to a flash photography mode, a diaphragm mechanism is automatically set to be adjusted in a so-called flashmatic mode, whereby the diaphragm aperture is adjusted commensurate with an object-to-lens distance.

In general, a starting position of a control member, which is adapted to control the diaphragm aperture in accordance with an object-to-lens distance setting or focus adjustment, corresponds to a maximum or minimum diaphragm aperture so that the diaphragm aperture is varied from maximum to minimum size or vice versa as the control member moves from the starting to a terminal position thereby enabling full range control of the diaphragm aperture in a flashmatic exposure control mode or in a follow-focus aperture control mode.

However, with a conventional camera, in which a diaphragm aperture may be set manually, the aforesaid diaphragm adjusting member is stopped in various positions depending on the manual setting. Thus, it is possible that when the camera is set to a flashmatic photography mode, the diaphragm adjusting member fails to be set to the maximum (or minimum) aperture position, i.e., to the position engageable with a control member at the starting position.

In the aforesaid situation, when a flashmatic mechanism is operated, the interrelationship between the control member and the diaphragm adjusting member may not be established until the control member engages the diaphragm adjusting member at the position manually set, before the flashmatic photography mode is set. This leads to the failure of adjustment of a diaphragm aperture for the range from the maximum to the manually set values, with a resulting less than optimum exposure during the photographic operation for the object-to-lens distance that requires a certain diaphragm aperture within such range.

The aforesaid shortcoming may be avoided by the photographer, who sets the diaphragm to the maximum (or minimum) aperture before switching a camera to a flashmatic photography mode. However, such a preparatory operation is apt to be omitted by the photographer, so that the aforesaid shortcoming remains unresolved.

SUMMARY OF THE INVENTION

It is an object of the present invention to provide a camera in which a diaphragm aperture may be manually set, and which may be set to a flashmatic photography mode or follow-focus aperture control mode, wherein the diaphragm aperture may be automatically adjusted commensurate with an object-to-lens distance.

It is another object of the present invention to provide a camera wherein, upon switching from a non-flash or daylight photography mode to a flash photography mode, a diaphragm adjusting mechanism may be automatically moved from a manually set position to a position engaging a control member at the starting position thereof, and during flash photography, a flashmatic operation may be achieved for the full range of the diaphragm aperture, thereby enabling the photographic operation to be carried out at an optimum exposure value.

It is still another object of the present invention to provide a camera which is easy to operate, such that a switching of the camera to a flash photography mode and the return operation of a diaphragm mechanism to its starting position may be effected in response to the mounting of a flash means on the camera, without resorting to a special operation.

According to one embodiment of the present invention, a flashmatic diaphragm control member adapted to operate a diaphragm adjusting member, upon flashmatic photography, operates differently depending on the sensitivity of the film loaded in the camera. As a result, any exposure error incurred due to a difference in film sensitivity during a flash photography mode may be automatically compensated for or eliminated, thus dispensing with a special operation required to compensate for the exposure error.

Further, according to another aspect of the preferred embodiment of the present invention, the mechanism for automatically setting or accomplishing the flashmatic exposure control mode in response to mounting the flash device on the camera, is made non-operative by manual operation so as to enable the diaphragm to be manually set in spite of the already mounted flash device, whereby change-over between a manual setting mode for day light or ambient light photography and a flashmatic exposure control mode for flash light or artificial light photography can be effected both automatically and manually.

According to the present invention, the mounting of the flash means on the camera automatically switches the camera to a flashmatic photography mode, thus dispensing with the setting of the diaphragm to its maximum or minimum aperture during flashmatic photography, as in the prior art, and improves the ease in operability of the camera to a large extent. In addition, the provision of a film sensitivity detecting member enables the sensitivity of the film loaded in the camera to be automatically detected, and facilitates cooperation with a flashmatic mechanism so as to accommodate itself to the sensitivity of the film thus selected. Yet furthermore, the flashmatic mechanism may be released, as required for manual operation.

BRIEF DESCRIPTION OF THE DRAWINGS

FIG. 1 is a perspective view of an essential portion of an embodiment of the invention;

FIG. 2 is a perspective view of an essential portion of another embodiment of the invention; and FIG. 3 is a plan view of an essential portion of still another embodiment of the invention.

DESCRIPTION OF THE PREFERRED EMBODIMENTS

Referring now to FIG. 1, two diaphragm blades 1 forming a diaphragm mechanism respectively having a diaphragm aperture 1a, are connected via connecting pins 2a, 2b to the opposite ends of a diaphragm operating lever 2 mounted for rotation on a camera body (not shown), so that when diaphragm operating lever 2 is rotated about its axis 3, the diaphragm blades are moved in opposite directions to vary the size of an aperture formed by the overlapping of the apertures 1a of the blades.

Connecting pin 2a of diaphragm operating lever 2 extends frontward of the camera body and is maintained in engagement with a bifurcated portion 5a of a diaphragm adjusting member 5 which is adapted to move to the right and to the left, as guided by a guide pin 4. As a result, when any one of aperture value marks 5b on diaphragm adjusting member 5 forming a diaphragm aperture setting mechanism together with lever 2 is registered with a fixed index 6 on a side of the camera body, an angular position of diaphragm operating lever 2 is determined commensurate with a selected one of aperture value marks 5b, so that a desired diaphragm aperture may be set. Diaphragm adjusting member 5 has formed thereon click notches 5c, with which the tip of a click lever or restraining means 9 pivoted by a pin 7 on the camera body and biased by a spring 8 for clockwise rotation, is brought into engagement. Thus, a click stop may work for each position of the adjusting member determined by aperture value marks 5b.

A, focus-adjusting member or operating plate 11, which is slidable to the right and to the left as guided by guide pins 10 mounted on the camera body has a first cam 11a provided there in contact with a focus adjusting pin 13 for adjusting the focus of an objective lens 12 (mounted on the camera in a normal manner for movement along its optical axis) in accordance with the position of member 11. A second cam 11b is provided on member 11 in contact with a pin 14a fixed on a view finder block 14 having a range finder, for rotating block 14 about a shaft 15 in accordance with the movement of member 11, thereby compensating for parallax between the objective lens and a view finder optical system. A third cam 11c is provided on member 11 in contact with a pin 16a for shifting a lens 16 of a distance-measuring optical system and for deflecting a distance-measuring optical axis in accordance with the relative position of member 11 so that the focusing condition of objective lens 12 may be indicated in a view finder by the relative position of the image introduced through lens 16 with respect to the main view finder image. And, a fourth cam 11d is provided on member 11 in contact with a pin 19a mounted on a first flashmatic lever 19 biased by spring 18 for clockwise rotation on a pin 17, thereby rotating lever 19 in response to movement of focus-adjusting member 11.

A second flashmatic lever or control member 20 is pivoted on pin 17 carried by flashmatic lever 19, an arm 20a of lever 20 being positioned in a moving path of pin 19a. Lever 20 has its tail portion 20b positioned in the path of a bent portion 5d of diaphragm adjusting member 5. As a result, when a well known flash device (not shown) having a given guide number is mounted on the camera, as will be described hereinafter, levers 19, 20 are brought into cooperative relationship with focus-adjusting member 11, so that diaphragm adjusting member 5 may assume a position commensurate with that of member 11, for setting an aperture value which may satisfy a formula that a guide number $(GNo) =$ aperture value $(F) \times$ distance $(S)$. In other words, fourth cam 11d serves as a so-called distance cam in a flashmatic mechanism.

Focus-adjusting member 11 also has a fifth cam 11e formed thereon. Cam 11e may be in contact with a pin 23a on a third flashmatic lever 23 pivoted on a shaft or pin 21 and biased by a spring 22 for clockwise rotation. Tip portion 23b of lever 23 is capable of contacting a bent portion 20c of second flashmatic lever 20. Thus, upon flash photography, when cam 11e is selected commensurate with a film sensitivity, second and third flashmatic levers 20 and 23 are operated in cooperative relationship with focus-adjusting member 11, so that diaphragm adjusting member 5 is operated commensurate with the position of member 11, thus allowing the setting of an aperture value which satisfies the relationship $GNo = F \times S$. In other words, fifth cam 11e serves as a second distance cam in the flashmatic mechanism.

As can be seen from the foregoing, fourth cam 11d and fifth cam 11e both serve as distance cams in the flashmatic mechanism. However, the cams are selectively used depending on film sensitivity.

For instance, fourth cam 11d may be used for a low or normal film sensitivity, for instance ASA 80, while fifth cam 11e may be selected for a high film sensitivity, for instance, ASA 200. The aforesaid selection of cams is automatically made relative to the charging of a film into the camera, as will be described hereinafter.

A distance setting or focusing dial 24 is mounted on the camera body for manual rotation and has a pin 24a thereon which engages in a bifurcated portion 11f of focus-adjusting member 11, so as to effect interrelated movement of members 11 and 24, and as a result, to permit indication, with a scale 24b on dial 24, of an object-to-lens distance set through focus-adjusting member 11. With such an arrangement, levers 19 and 23 function to interlock control member 20 with distance setting dial 24 via member 11. Accordingly, an object-to-lens distance may be set by registering any one of distance marks 24b with an index line 5e on diaphragm adjusting member 5. In addition, on both sides of index line 5e is a mark having its width varied along the direction of line 5e from a maximum width 5f, so that the width of the mark defined by the peripheral edge of dial 24 may be varied as diaphragm setting member 5 moves under dial 24 commensurate with the diaphragm setting operation. As a result, a depth of field may be indicated by the cooperation of a distance mark 24b with the width of the mark defined by the peripheral edge of dial 24.

During a daylight photographic operation, second flashmatic lever 20 is retained by a flashmatic mode setting lever 25 in a position where its tail portion 20b is away from bent portion 5d of diaphragm adjusting member 5. More particularly, flashmatic mode setting lever 25, pivoted on a shaft or pin 26, has its bent portion 25a positioned in a recess formed on the bottom plate of accessory shoe 27 of the camera, and has its other end 25b in engagement with a pin 29a mounted on one end of a first intermediate or transmission lever 29 pivoted on a pin 28. Also pivoted on pin 28 is a second intermediate lever or selecting member 31 biased by a spring 30 for clockwise rotation and having its arm 31a engaging bent portion 20c of second flashmatic lever 20. Second intermediate lever 31 may follow first intermediate lever 29 under the action of a spring 32. Members 25, 29 and 31 form an exposure control mode selecting means.

Thus, during the time, when a flash device (not shown) is not mounted on accesory shoe 27, second flashmatic lever 20 is retained at the aforesaid position under the action of a spring 30 connected to second intermediate lever 31, while bent portion 25a of flashmatic mode setting lever 25 is positioned within the recess of accessory shoe 27 by means of first intermediate lever 29.

When the flash device (not shown) is mounted on shoe 27, lever 25 is rotated clockwise against the force of springs 30 and 32, thereby rotating first intermediate lever 29 counterclockwise, and rotating second intermediate lever 31 counterclockwise, with the result that arm 31a thereof is retracted from bent portion 20c of second flashmatic lever 20, thereby releasing the retention of lever 20.

A third intermediate lever 33 is in contact at one end thereof with a tail bent portion 31b of second intermediate lever 31, and the counterclockwise rotation of second intermediate lever 31 causes clockwise rotation of third intermediate lever 33 pivoted on a pin 34. The opposite end of third intermediate lever 33 engages tail bent portion 9a of click lever 9, so that the clockwise rotation of lever 33 causes the click lever 9 to rotate counterclockwise against the force of spring 8, thereby releasing diaphragm adjusting member 5.

A spring 35 is connected to diaphragm adjusting member 5 for urging member 5 constantly to the left, so that upon release of click lever 9, adjusting member 5 is moved to the left, thereby causing bent portion 5d to come into contact with tail portion 20b of second flashmatic lever 20. Thereafter, diaphragm adjusting member 5 is controlled by means of fourth and fifth cams 11d and 11e through the first, second and third flashmatic levers 19, 20 and 23 to be set to an aperture determinative position corresponding to a set object-to-lens distance.

It should be noted that, upon the mounting of a flash device on the camera, diaphragm adjusting member 5 is moved towards the side of maximum or minimum aperture (in the drawing, towards the maximum aperture), and is thereafter operated by means of second flashmatic lever 20.

The counterclockwise rotation of second intermediate lever 31 further effects a rightward shift of a manual mode selecting member 36 to a flashmatic position under the assistive force of a spring 37, through engagement of a bifurcated portion 31c with a pin 36a carried on manual member 36 which is guided by pins 38 located in elongated slots of the manual member. When manual member 36 is shifted to the flashmatic position, a switch 39 is turned off to set a shutter control device (not shown) to a condition to provide a shutter speed suitable for flash photography in a not shown but well known manner, and to actuate an indicator (also not shown but well known) to indicate that the camera is set to the flashmatic mode.

Manual mode selecting member 36 may be used to intentionally make the flashmatic condition inoperative when a flash device is mounted on the camera. In other words, when manual member 36 is pushed leftward to the AUTO position, with the flash means mounted in place, then a click spring 36b engages a projection 25c of flashmatic mode setting lever 25 which has been rotated clockwise due to the mounting of the flash means, so that manual member 36 may be locked at an AUTO position. The leftward movement of manual member 36 causes an increase in tension in spring 32 as second intermediate lever 31 is rotated clockwise. As a result, arm 31a of second intermediate lever 31 comes into contact with the bent portion 20c of second flashmatic lever 20 so as to move lever 20 away from the operational range of bent portion 5d and at the same time release click lever 9 through third intermediate lever 33, thereby allowing lever 9 to engage into any one of click notches 5c. Thus, diaphragm adjusting member 5 comes to be manually adjusted. In addition, the leftward movement of manual member 36 closes switch 39 for setting the shutter control devive to a normal shutter control condition. Meanwhile, manual releasing member 36 may be moved to an AUTO position, as the case may be, when an electronic flash device having an automatic light amount control system is coupled with the camera.

A film sensitivity detecting lever 41 is pivoted on a pin 40 in the vicinity of a film chamber (not shown) of the camera. A detecting portion 41a of lever 41 is so provided as to be moved in or out of the film chamber. Detecting portion 41a may detect the presence of a larger projecting portion or rib 42a or a shorter rib 42b, respectively formed on film cartridges 42A or 42B, relying on the sensitivity of the film contained in the cartridge. Lever 41 may thus be moved to two different positions as shown in phantom and solid outline in FIG. 1, depending on the sensitivity of a film charged in the camera.

For instance, when film cartridge 42A including a film of an ordinary film sensitivity is charged in the camera, detecting lever 41 assumes a solid outline position shown in the drawing, thereby pushing the bent portion 23c of third flashmatic lever 23 through a change-over lever 44 against the force of spring 22, for bringing pin 23a away from fifth cam 11e. As a result, the control of diaphragm adjusting member 5 in the flashmatic photography mode is taken over by fourth cam 11d.

On the other hand, when film cartridge 42B including a film of a sensitivity different from the foregoing cartridge is charged in the camera, detecting lever 41 is rotated, due to the omission of an extending portion (shown in phantom outline) in rib 42b to a position shown in phantom outline through third flashmatic lever 23 and change-over lever 44 under the action of spring 22. As a result, pin 23a on third flashmatic lever 23, which pin has been rotated clockwise under the action of spring 22, is brought into contact with fifth cam 11e, while tip 23b of third flashmatic lever 23 pushes bent portion 20c of second flashmatic lever 20, thereby controlling diaphragm adjusting member 5 by means of fifth cam 11e through the lever 20. In addition, at this time, pin 19a on first flashmatic lever 19 contacts fourth cam 11d, so that lever 19 is rotated. However, arm 20a of second flashmatic lever 20 is kept away from pin 19a on first flashmatic lever 19 due to clockwise rotation of third flashmatic lever 23 when pin 23a contacts cam 11e, so that cam 11d does not act on second flashmatic lever 20.

FIG. 2 shows another embodiment of the invention, in which spring 35 tending to bias diaphragm adjusting member 5 to the left, is connected to a tail end 31b' of second intermediate or charge lever 31', and thus diaphragm adjusting member 5 is strongly baised to the left when flashmatic mode selecting lever 25 has been rotated clockwise to the flashmatic position due to the mounting of the flash device on accessory shoe 27. It is to be noted that like parts are designated with like reference numerals throughout FIGS. 1 and 2, and unlike parts bear a prime (') designation in FIG. 2. When spring 35 is strongly pulled by second intermediate lever 31' as mentioned above, then diaphragm adjusting member 5 overcomes a force of a click stop spring 9' so as to move to the left, whereupon its bent portion 5d comes into contact with tail portion 20b of second flashmatic lever 20. Thereafter, lever 20 controls diaphragm adjusting member 5. In other words, FIG. 2 shows the embodiment wherein the camera may be set to a flashmatic photography mode, without releasing the click lever.

FIG. 3 shows still another embodiment of the invention, in which a flashmatic mode setting or operating lever 25', biased by a spring 30' in a counterclockwise direction, is rotated clockwise due to its portion 25a' being pushed by the flash device, when the flash device is mounted on accessory shoe 27. With such an arrangement, a tip portion 25b' of lever 25' pushes a projection 5g on diaphragm adjusting member 5 to move member 5 to the right, as shown by a dashed arrow, against the action of click stop spring 9'. As a result, diaphragm operating or aperture control lever 2, whose pin 2a' has been engaged with an arm 5a' of diaphragm adjusting member 5, is operated so as to move the diaphragm blades (not shown) in the direction to stop down the diaphragm aperture to the minimum size under the action of a spring 35', so that pin 2a' contacts a second flashmatic or control lever 20' for setting the camera to a flashmatic photography mode. In this respect, diaphragm adjusting member 5 is locked by means of flashmatic mode setting lever 25' to the position which has no bearing on the diaphragm operating lever 2. Shown at 5h is a return spring for diaphragm adjusting member 5, which is used upon the releasing of a flashmatic mechanism.

FIGS. 1 and 2 show the embodiments in which, upon setting of a flashmatic photography mode, the diaphragm blades are moved in the direction to widen a diaphragm aperture to its maximum aperture, while FIG. 3 shows the embodiment wherein a diaphragm is set to the minimum aperture.

As is apparent from the foregoing description of the invention, the mounting of a flash means on a camera effects an automatic switching to the flashmatic photography mode, thereby dispensing with a need to set the diaphragm to the maximum or minimum aperture, upon flashmatic photography, as in the prior art. This improves the ease in operability of the camera to a large extent. In addition, the provision of a film sensitivity detector enables the automatic detection of the sensitivity of a film charged in the camera, whereupon the flashmatic mechanism may be brought into cooperative relationship with the sensitivity thereof. Still furthermore, the flashmatic mechanism may be released, as required, for allowing the manual operation of the camera, thereby presenting many advantages.

I claim:

1. A camera, comprising in combination:
a diaphragm aperture setting mechanism mounted on a body of the camera for manual movement to set the diaphragm aperture;
a diaphragm mechanism engageable with said setting mechanism for determining the diaphragm aperture in accordance with the setting thereof;
manually operable distance setting means;
an objective lens mounted on the camera body for movement along its optical axis in accordance with the setting by said distance setting means;
means for adjusting said diaphragm aperture in accordance with a set position of said distance setting means, said adjusting means including a movable control member engageable with said diaphragm mechanism to control same as a function of the position of said control member, and further including means for interlocking said control member with said distance setting means;
biasing means connected to said diaphragm setting mechanism for urging same in a direction to engage said control member;
means for restraining said diaphragm mechanism in a position determined by said diaphragm aperture setting mechanism; and
exposure control mode selecting means movable between a first position for rendering said restraining means ineffective and said adjusting means effective, and a second position for rendering said restraining means and said adjusting means to be of opposite condition to that at said first position of said selecting means.

2. A camera as set forth in claim 1, wherein said biasing means includes a spring having one end secured to said diaphragm setting mechanism, and said exposure control mode selecting means includes a charge lever connected to the other end of said spring, said charge lever movable between a charging position for charging said spring so that the spring may overcome the restraint by said restraining means to move said diaphragm setting mechanism and accomplish coupling of the latter with said control lever and a relaxed position for relaxing said spring so that said restraining means overcome the force of the spring.

3. A camera as set forth in claim 1, wherein said diaphragm setting mechanism includes a diaphragm setting member and an aperture control lever for controlling diaphragm aperture, said aperture control lever being alternatively engageable with said diaphragm setting member and said control lever, said biasing means includes a spring for biasing said aperture control lever in a direction to engage with said diaphragm setting member and said control lever, and said exposure control mode selecting means includes an operating lever for moving said diaphragm setting member out of the path of said aperture control lever and for causing said aperture control lever to come into engagement with said control lever.

4. A camera as set forth in claim 1, wherein said diaphragm aperture setting mechanism includes a diaphragm aperture setting member movable in relation to a manual setting operation, said biasing means includes a spring urging said diaphragm aperture setting member in a direction to engage with said control member, and said restraining means includes a plurality of notches formed on said diaphragm aperture setting member and a click lever engageable with one of said notches for retaining said diaphragm setting member at a desired position against said spring upon engagement with one of said notches, said click lever being interconnected with said exposure control mode selecting means to be moved to a position where it engages with one of said notches, when said exposure control mode selecting means is set from the first position to the second position.

5. A camera as set forth in claim 4, wherein said distance setting means includes an operating plate movable in accordance with a distance setting manual operation and has a cam means formed thereon; said interlocking means includes an operating lever for moving said diaphragm aperture setting member through said control lever in accordance with the movement of said can means; said exposure control mode selecting means includes a selecting member interconnected with said click lever and said control lever, said selecting member being movable between a first position for retaining said click lever in a position removed from said notches and for setting said control lever in the active condition for being movable in accordance with the movement of said operating lever and a second position for permitting said click lever to engage one of said notches and for setting said control lever in the inactive condition where said control lever is retained out of the path of said diaphragm aperture setting member for disabling the transmission of the movement of said operating lever to said diaphragm aperture setting member; and said selecting means further includes a detecting lever which moves said selecting member from the second position to the first position in relation with the operation of mounting a flash unit to the camera.

6. A camera as set forth in claim 5, further comprising manual means for manually changing exposure control mode when the flash unit is mounted on the camera, and wherein said exposure control mode selecting means includes a transmission lever engageable with said selecting member and said detecting lever for setting said selecting member in a first position and in a second position in accordance with the position of said detecting lever, said transmission lever being movable independently of said detecting lever to change the position of said selecting member, and said manual means includes a manually operable member for manually moving said selecting member independently of said detecting lever, whereby the exposure control made may be changed without removing the flash unit from the camera.

7. A camera as set forth in claim 5, wherein said camera is adapted to selectively accept a film cartridge provided with a signal structure having a predetermined configuration depending on the sensitivity of film contained in the cartridge; said cam means includes first and second cam portions; said operating lever includes a first operating lever for controlling said control member in accordance with said first cam portion, a second operating lever for controlling said control member in accordance with said second cam portion; and said camera further includes a film sensitivity detecting member the position of which is dependent on the configuration of said film cartridges, and a selecting mechanism for interlocking said first and second member with said control member alternatively depending on the position of said film sensitivity detecting lever.

8. A camera as set forth in claim 7, further comprising a view finder optical system, a cam portion formed on said operating plate, and means for deflecting said view finder optical system in accordance with said cam to compensate for parallax between said view finder and the camera objective.

* * * * *